United States Patent [19]

Wu

[11] 4,184,997
[45] Jan. 22, 1980

[54] COPOLYETHER-ESTERS AS ADDITIVES FOR FIBER-REINFORCED POLYETHYLENE TEREPHTHALATE

[75] Inventor: Souheng Wu, Wilmington, Del.

[73] Assignee: E. I. Du Pont de Nemours and Company, Wilmington, Del.

[21] Appl. No.: 889,040

[22] Filed: Mar. 22, 1978

[51] Int. Cl.² ........................ C08K 7/14; C08L 67/02
[52] U.S. Cl. .................................... 260/40 R; 525/421
[58] Field of Search ............................ 260/40 R, 860

[56] References Cited

U.S. PATENT DOCUMENTS

| | | | |
|---|---|---|---|
| 3,368,995 | 2/1968 | Furukawa et al. | 260/40 R |
| 3,516,957 | 6/1970 | Gray et al. | 260/40 R |
| 3,959,062 | 5/1976 | Hoh | 260/860 X |
| 3,963,800 | 6/1976 | Gyip et al. | 260/860 |
| 4,011,285 | 3/1977 | Seymour et al. | 260/40 R X |
| 4,048,128 | 9/1977 | Eastman | 260/860 X |
| 4,064,098 | 12/1977 | Saitoh et al. | 260/40 R |
| 4,081,494 | 3/1978 | Sakai et al. | 260/860 |

*Primary Examiner*—Sandra M. Person

[57] ABSTRACT

Fiber-reinforced polyethylene terephthalate molding compositions containing
(A) about 20 to about 80% by weight of polyethylene terephthalate;
(B) about 5 to about 50% by weight of a reinforcing fiber; and
(C) about 6 to about 60% by weight of a copolyether-ester consisting essentially of
(a) long-chain ester units having the formula:

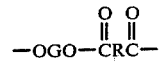

wherein G is the divalent radical remaining after removal of the terminal hydroxyl groups from a poly(alkylene oxide) glycol having a number-average molecular weight of about 400 to about 6000; and R is the divalent radical remaining after removal of the carboxyl groups from a dicarboxylic acid; and
(b) short-chain ester units having the formula:

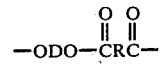

wherein D is the divalent radical remaining after removal of the hydroxyl groups from a low molecular weight diol having a molecular weight of less than about 250; and R is as defined above;
with the proviso that the short-chain ester units constitute about 40 to about 90% by weight of the polyether-ester, and the long-chain ester units constitute about 10 to about 60% by weight of the copolyether-ester provide injection molded articles having improved surface smoothness.

7 Claims, No Drawings

COPOLYETHER-ESTERS AS ADDITIVES FOR FIBER-REINFORCED POLYETHYLENE TEREPHTHALATE

BACKGROUND OF THE INVENTION

1. Field of the Invention

This invention relates to thermoplastic molding compositions based on fiber-reinforced polyethylene terephthalate compositions, and more particularly to fiber-reinforced blends of polyethylene terephthalate and selected copolyether-esters which give molded articles having reduced surface roughness.

2. The Prior Art

Glass fiber-reinforced polyethylene terephthalate has a number of advantageous properties as an engineering plastic. These include excellent dimensional stability, high strength and stiffness, and good physical characteristics. However, a major disadvantage of this material is that injection-molded articles tend to have very rough surfaces.

French Pat. No. 2,194,741 (equivalent to German Offen. 2,338,615) broadly discloses compositions containing polymer blends of a polyester with 1.5–90% of a poly(ether-ester) which contains 7–95% by weight of long-chain ester segments. Addition of the poly(ether-ester) gives molding compositions with improved impact strength. Although the patent mentions the addition of reinforcing materials such as glass fibers and filler, it does not exemplify fiber-reinforced polyethylene terephthalate resins, or mention the roughness problem associated therewith. In the only example illustrating the use of a filler (Example 7), polyethylene terephthalate was not used as the polyester. In the examples which employ polyethylene terephthalate as the polyester component (Examples 1, 4 and 8), the poly(ether-ester) component contains more than 60% by weight of long-chain ester segments.

In U.S. Pat. No. 3,652,713, polyester compositions with improved antistatic properties comprising a blend of polyethylene terephthalate with a polyether-polyester block copolymer are disclosed, but fiber-reinforced polymers are not disclosed. U.S. Pat. No. 3,652,714 teaches that the disperse dyeability and dry cleaning fastness of polyethylene terephthalate fibers are greatly improved by blending with a polyester-ether polymer such as polyethylene oxybenzoate.

SUMMARY OF THE INVENTION

According to the present invention, there is provided a fiber-reinforced polyethylene terephthalate molding composition which produces molded articles having reduced surface roughness which comprises a mixture of:

(A) about 20 to about 80% by weight of polyethylene terephthalate having a relative viscosity of about 12 to about 90;

(B) about 5 to about 50% by weight of reinforcing fibers; and (C) about 6 to about 60% by weight of a copolyether-ester having a number average molecular weight of about 3,000 to about 75,000, said copolyether-ester consisting essentially of a multiplicity of recurring intralinear long-chain and short-chain ester units connected through ester linkages, (a) said long chain ester units having the formula:

wherein G is the divalent radical remaining after removal of the terminal hydroxyl groups from a poly(alkylene oxide) glycol having a carbon-to-oxygen mole ratio of about 2 to about 4.3 and a number-average molecular weight of about 400 to about 6000; and R is the divalent radical remaining after removal of the carboxyl groups from a dicarboxylic acid having a molecular weight of less than about 300; and (b) said short-chain ester units having the formula:

wherein D is the divalent radical remaining after removal of the hydroxyl groups from a low molecular weight diol having a molecular weight of less than about 250; and R is as defined above; with the proviso that the short-chain ester units constitute about 40 to about 90% by weight of the copolyether-ester, and the long-chain ester units constitute about 10 to about 60% by weight of the copolyether-ester.

DETAILED DESCRIPTION OF THE INVENTION

Fiber-reinforced polyethylene terephthalate possesses good strength, stiffness and dimensional stability which is useful for injection molding large bodies and mechanical parts, e.g. in automotive applications. A serious deficiency of such injection-molded articles is that surface roughness makes them difficult to decorate, abrasive, and difficult to fabricate to close tolerances. It has been discovered in accordance with this invention that the addition of about 6 to about 60%, and preferably about 10 to about 35%, by weight of a copolyether-ester resin to fiber-reinforced polyethylene terephthalate resins gives molded articles with greatly decreased surface roughness and consequently greatly improved appearance.

One of the essential components of the thermoplastic molding compositions of this invention is polyethylene terephthalate of the type conventionally used in glass fiber-reinforced polyethylene terephthalate resins. The term "polyethylene terephthalate," as used throughout the specification and claims, is meant to include polyethylene terephthalate itself, as well as copolymers containing up to about 25% of components of other polyesters having a melting point between about 200° C. and the melting point of polyethylene terephthalate. Such copolymers, which generally resemble polyethylene terephthalate itself, may have some of the ethylene glycol replaced by other aliphatic or cycloaliphatic diols or some of the terephthalic acid replaced by isophthalic acid, an aliphatic diacid or another aromatic diacid. The processing temperature of these polymers is usually from about 250° to about 310° C.

The polyethylene terephthalate should have a relative viscosity (measured at 0.8 gram per 10 ml of hexafluoroisopropanol and 100 parts per million of sulfuric acid) of from about 12 to about 90, and preferably from about 16 to about 30. The polyethylene terephthalate component of the molding composition comprises about 20 to about 80% by weight of the total composition, and preferably about 45 to about 70%.

The specific reinforcing fibers used in the compositions of the invention is not critical. They can be selected from a wide variety of inorganic and organic fibers which are insoluble in solid polyethylene terephthalate. By "fibers" is meant reinforcing materials having an aspect ratio (length/diameter) of at least about 3. Typical reinforcing fibers are glass fiber, asbestos fiber, carbon fiber, metallic fiber, titanate fiber, aramid fiber, and other fibers which may be treated, if desired, with appropriate coupling agents. Preferred are inorganic reinforcing fibers, particularly fibers which are less than about one inch in average length. Particularly preferred are glass fibers, and especially preferred are E glass fibers of about 5 to about 100μ in diameter and about 15μ to about 1.25 cm in length. The reinforcing fibers comprise about 5 to about 50% by weight, and preferably about 20 to about 30% by weight, of the molding composition.

The copolyether-ester resins suitable for use in the molding compositions of the invention may have a wide range of molecular weights, i.e. number-average molecular weights of about 3,000 to about 75,000. Polymers which have molecular weights of about 25,000 to about 45,000 are preferred since many in this range are commercially available. A number-average molecular weight of about 25,000 corresponds to an inherent viscosity of about 1.2, measured in m-cresol in 0.1 g/dl concentration at 30° C.

The copolyether-ester resins consist essentially of a multiplicity of recurring intralinear long-chain and short-chain ester units connected through ester linkages. The term "long-chain ester units," as applied to units in the copolyether-ester component of the molding composition, refers to the reaction product of a poly(alkylene oxide) glycol with a dicarboxylic acid. Such long-chain ester units, which are repeating units in the copolyether-ester, have the formula:

$$-OGO-\overset{O}{\underset{\|}{C}}R\overset{O}{\underset{\|}{C}}- \quad (a)$$

wherein G is the divalent radical remaining after removal of the terminal hydroxyl groups from a poly(alkylene oxide) glycol having a carbon-to-oxygen mole ratio of about 2 to about 4.3 and a number-average molecular weight of about 400 to about 6000; and R is the divalent radical remaining after removal of the carboxyl groups from a dicarboxylic acid having a molecular weight of less than about 300, and preferably a phthalic acid.

Suitable poly(alkylene oxide) glycols which are polymeric glycols having internal ether linkages and terminal (or as nearly terminal as possible) hydroxyl groups are described in U.S. Pat. No. 3,907,926, and include poly(ethylene oxide) glycol, poly(1,2- and 1,3-propylene oxide) glycol, polytetramethylene ether glycol (derived from tetrahydrofuran), random and block copolymers of ethylene oxide and 1,2-propylene oxide, and random and block copolymers of tetrahydrofuran with minor amounts of a second monomer such as 3-methyltetrahydrofuran used in proportions such that the carbon-to-oxygen mole ratio in the glycol does not exceed about 4.3. Preferred poly(alkylene oxide) glycols have an alkylene moiety, $-(CH_2)_n-$, in which n is 2–8 carbon atoms.

The term "short-chain ester units," as applied to units in the copolyether-ester component of the molding composition, refers to the reaction product of a low molecular weight diol with a dicarboxylic acid. Such short-chain ester units, which are repeating units in the copolyether-ester, have molecular weights of less than about 550 and correspond to the formula:

$$-ODO-\overset{O}{\underset{\|}{C}}R\overset{O}{\underset{\|}{C}}- \quad (b)$$

wherein D is the divalent radical remaining after removal of the hydroxyl groups from a low molecular weight diol having a molecular weight of less than about 250, and R is as defined above for the long-chain ester units.

Included among the low molecular weight diols which are suitable for use in the short-chain ester units are aliphatic, cycloaliphatic, and aromatic dihydroxy compounds. Preferred are diols of 2–15 carbon atoms such as ethylene, propylene, tetramethylene, pentamethylene, 2,2-dimethyltrimethylene, hexamethylene, and decamethylene glycols, dihydroxycyclohexane, cyclohexanedimethanol, resorcinol, hydroquinone, 1,5-dihydroxynaphthalene, and the like. More preferred are aliphatic diols of 2–8 carbon atoms, especially  where n is 2–4. Included among suitable aromatic dihydroxy compounds are bis(p-hydroxy)diphenyl, bis(p-hydroxyphenyl)methane, and bis(p-hydroxyphenyl)propane.

The term "low molecular weight diol," as used herein, should be construed to also include equivalent ester-forming derivatives of these diols. For example, ethylene oxide or ethylene carbonate can be used in place of ethylene glycol. In the case of equivalent ester-forming derivatives, the molecular weight requirement pertains to the diol rather than to the ester-forming derivative.

Dicarboxylic acids which are reacted with the foregoing long-chain glycols and low molecular weight diols to produce the copolyether-esters used in this invention are also disclosed in U.S. Pat. No. 3,907,926. Suitable dicarboxylic acids include aliphatic, cycloaliphatic, and aromatic dicarboxylic acids of a low molecular weight, i.e., having a molecular weight of less than about 300.

The term "aliphatic dicarboxylic acid," as used herein, refers to a carboxylic acid having two carboxyl groups, each attached to a saturated carbon atom. If the carbon atoms to which the carboxyl groups are attached are saturated and are in a ring, the acid is cycloaliphatic. Aliphatic or cycloaliphatic acids having conjugated unsaturation often cannot be used because of homopolymerization. However, some unsaturated acids, such as maleic acid, can be used.

Representative aliphatic and cycloaliphatic acids which can be used in this invention are sebacic acid, 1,3-cyclohexanedicarboxylic acid, 1,4-cyclohexanedicarboxylic acid, adipic acid, glutaric acid, succinic acid, carbonic acid, oxalic acid, azelaic acid, diethylmalonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthalenedicarboxylic acid, 4,4'-bicyclohexyldicarboxylic acid, decahydro-2,6-naphthalenedicarboxylic acid, 4,4'-methylene-bis(cyclohexanecarboxylic acid), 3,4-furandicarboxylic acid, and 1,1- cyclobutanedicarboxylic acid. Preferred aliphatic acids are the cyclohexanedicarboxylic acids and adipic acid.

The term "aromatic dicarboxylic acid," as used herein, refers to a dicarboxylic acid having two carboxyl groups, each attached to a carbon atom in an isolated or fused benzene ring. It is not necessary that both functional carboxyl groups be attached to the same aromatic ring and where more than one ring is present, they can be joined by aliphatic or aromatic divalent radicals or nonorganic divalent radicals such as —O— or —$SO_2$—.

Representative aromatic dicarboxylic acids which can be used include terephthalic, phthalic and isophthalic acids, bi-benzoic acid, substituted dicarboxy compounds with two benzene nuclei such as bis(p-carboxyphenyl)methane, p-oxy(p-carboxyphenyl)benzoic acid, ethylene-bis(p-oxybenzoic acid), 1,5-naphthalenedicarboxylic acid, 2,6-naphthalenedicarboxylic acid, 2,7-naphthalenedicarboxylic acid, phenanthrenedicarboxylic acid, anthracenedicarboxylic acid, 4,4'-sulfonyldibenzoic acid, and ring substitution derivatives thereof, such as halo, $C_1$–$C_{12}$ alkyl, alkoxy and aryl derivatives. Hydroxyl acids such as p(β-hydroxyethoxy)benzoic acid can also be used providing an aromatic dicarboxylic acid is also present.

Aromatic dicarboxylic acids are an especially preferred class of dicarboxylic acids for preparing the copolyether-esters used in this invention. Among the aromatic acids, those with 8–16 carbon atoms are preferred, particularly the phenylenedicarboxylic acids, i.e., phthalic, terephthalic and isophthalic acids.

The term "dicarboxylic acid," as used herein, includes equivalents of dicarboxylic acids having two functional groups which perform substantially like carboxylic groups in reaction with glycols and diols in forming copolyether-ester polymers. These equivalents include esters and ester-forming derivatives, such as dimethyl esters, acid halides and anhydrides. In the case of equivalent ester or ester-forming derivatives, the molecular weight requirement pertains to the dicarboxylic acid rather than to the ester or ester-forming derivative. Thus, a dicarboxylic acid ester or dicarboxylic acid halide having a molecular weight greater than 300 is included, provided the equivalent acid has a molecular weight below about 300. The dicarboxylic acids can contain any substituent groups or combinations which do not substantially interfere with the copolyether-ester polymer formation or use of the molding compositions of this invention.

It is preferred that at least about 50% of the short-chain ester units be identical, and that the identical units be capable of forming a homopolymer in the fiber-forming molecular weight range (molecular weight > 5000) having a melting point of at least about 150° C., and preferably greater than about 200° C. Polymer melting points are conveniently determined by differential scanning calorimetry.

The short-chain ester units will constitute about 40 to about 90% by weight of the copolyether-ester. The remainder of the copolyether-ester will be the long-chain ester units, and thus the long-chain ester units will comprise about 10 to about 60% by weight of the copolyether-ester. Copolyether-esters in which the short-chain units comprise about 45 to about 75% by weight and the long-chain units comprise about 25 to about 55% by weight are preferred.

With regard to the manufacture of the copolyether-esters, they may be made by a conventional ester interchange reaction followed by conversion of the low molecular weight prepolymer to a higher molecular weight copolyether-ester by a "polycondensation" process at reduced pressure. The manufacturing process is described in detail in U.S. Pat. No. 3,907,926, Columns 4–6, and this portion of this patent is hereby incorporated by reference. Specific procedures for preparing copolyether-esters are given in the Examples.

The preferred copolyether-esters employed in this invention are those prepared from a dimethyl phthalate, 1,4-butanediol and polytetramethylene ether glycol having a number-average molecular weight of about 600 to about 2000. Most preferably, the dimethyl phthalate is at least about 70 mole percent dimethyl terephthalate, i.e. up to about 30 mole percent of the dimethyl terephthalate can be replaced by dimethyl ortho-phthalate or dimethyl isophthalate. The polytetramethylene ether glycols are especially preferred because they are easily prepared, have overall superior physical properties, and are especially resistant to water. Most preferred are copolyether-esters containing about 45 to about 75% by weight of short-chain ester units derived from dimethyl terephthalate and 1,4-butanediol.

The copolyether-ester compositions preferably also contain about 0.5 to about 5% by weight of an antioxidant, preferably 4,4'-bis(α,α-dimethylbenzyl)diphenylamine, 1,3,5-tris(3,5-di-tert-butyl-4-hydroxyhydrocinnamoyl)hexahydro-s-triazine or 1,6-bis[3-(3,5-di-tert-butyl-4-hydroxyphenyl)propionamido]hexane. Optionally, they may also contain a stabilizer, e.g., about 0.5 to about 3.0% by weight of amide linkages preferably provided by a copolymer of polycaprolactam and polyhexamethylene adipamide, or a terpolymer of polycaprolactam, polyhexamethylene adipamide, and polyhexamethylene sebacamide.

The antioxidant and the amide may be added at any time during preparation of the copolyether-ester or following its preparation. Preferably an antioxidant should be present during the polycondensation stage of the reaction in the amount of at least about 0.2% by weight, based on the estimated yield of copolyether-ester product, and preferably in the amount of about 0.5 to about 2.0% by weight. It is preferred that a suitable antioxidant be present at any stage in the process in which the poly(alkylene oxide) glycol is exposed to elevated temperatures, e.g., above about 100° C.

The antioxidant, depending on its melting point, may be added as a solid, as a molten liquid, or as a solution or dispersion in one or more of the reactants. In batch operations, it is conveniently added as a solid, or as a solution or dispersion in the diol or the poly(alkylene oxide) glycol at the time of charging the reactor. In continuous operations, the antioxidant is most conveniently added as a solution or dispersion in the diol and/or glycol stream entering the process. The antioxidant may, alternatively be introduced at later stages in the process, even after preparation of the copolyether-ester is complete. Although it is usually convenient to add the total amount of antioxidant desired in the finished copolyether-ester during its preparation, additional amounts of antioxidant can be added to the finished copolyether-ester by melt blending, if desired.

In addition to the components specified above, a wide variety of additives conventionally used in the art can be incorporated into the present molding compositions. For example, nucleating agents can be added in the amount of about 0.05 to about 3%, and preferably about 0.1 to about 1.5%. Of the many nucleating agents used in the art, talc has been found to be particularly effective in the instant invention. Mold release agents such as stearyl erucamide are typically added in amounts from about 0.03 to about 3.0%, and preferably from about 0.1 to about 1.5% by weight.

Various other processing aids such as crystalline growth promoters, e.g., copolyether-esters outside the scope of the copolyether-esters (component C) used in the invention, can also be included in the present mixture, generally in amounts of not more than about 10%. In addition, other components which provide colored compositions and resistance to flame; heat, hydrolysis and photodegradation can be incorporated, as will be evident to those skilled in the art.

In computing the composition of the molding compositions of this invention, the polyethylene terephthalate and copolyether-ester components are considered on the basis of being free of fillers and other additives, except for the oxidation and thermal stabilizers normally included in commercially available samples of these components.

Blending of the components of the molding composition can be accomplished by any convenient means, and the order of addition of these components is not a critical aspect of the present invention. In general, it is convenient to dry blend all components of the composition by tumbling, followed by melt blending, and then extrusion of the resulting mixture. Single or twin screw extruders of the type conventionally used in the art are satisfactory for the blending and extrusion. The molding compositions are typically extruded in the form of long strands and subsequently cut into short pellets which can be used in the intended molding operation. Provided the final compositions are within the stated limits, one or more species of polyethylene terephthalate may be blended with one or more species of copolyether-ester, and one or more species of reinforcing fiber. During all processing steps, the resins should be kept dry to prevent hydrolytic degradation of the polyethylene terephthalate and copolyether-ester, as will be evident to those skilled in the art.

The molding compositions of the instant invention can be used either alone or in combination with other molding resins in a wide variety of molding applications. The present compositions provide molded articles with exceptionally good surface smoothness at normal molding temperatures.

EMBODIMENTS OF THE INVENTION

The following are illustrative examples of the invention in which all parts and percentages are by weight and all degrees are Celsius unless otherwise stated.

Preparation of Catalyst

The catalyst used in preparing the copolyether-esters of the examples was prepared as follows: To 425 parts of anhydrous 1,4-butanediol was added 23.32 parts of tetrabutyl titanate. The mixture was agitated at 50° for 2-3 hours until the small amount of solids originally present disappeared.

PREPARATION OF COPOLYETHER-ESTER RESIN A

Copolyether-ester resin A can be prepared using the following charge in an agitated flask fitted for distillation:

| | |
|---|---|
| Polytetramethylene ether glycol (PTMEG), number-average molecular weight about 975 | 88.0 parts |
| 1,4-Butanediol | 73.0 parts |
| Dimethyl terephthalate (T) | 88.0 parts |
| Dimethyl isophthalate (I) | 24.7 parts |
| 1,6-Bis[3-(3,5-di-tert-butyl-4-hydroxyphenyl)-propionamido]-hexane antioxidant | 2.0 parts |
| Catalyst solution | 4.0 parts |

A stainless steel stirrer with a paddle cut to conform with the internal radius of the flask is positioned about one-eighth inch from the bottom of the flask and agitation is started. The flask is placed in an oil bath at 160°, agitated for five minutes, and then the catalyst is added. Methanol distills from the reaction mixture as the temperature is slowly raised to 250° over a period of one hour. When the temperature reaches 250°, the pressure is gradually reduced to 0.3 mm over a period of 20 minutes. The polymerization mass is then agitated at 250°/0.3 mm until the desired molecular weight is obtained. i.e. for about 35 minutes. The resulting molten product is scraped from the flask in a dry, oxygen-free nitrogen atmosphere and allowed to cool.

Preparation of Copolyether-Ester Resins B-E, G and H

Copolyether-ester resins B-E, G and H can be prepared by the procedure for resin A above using the appropriate amounts of starting materials. The molecular weights of the resins are varied by varying the polycondensation times. The number-average molecular weights of the copolyether-esters were determined by Gel Permeation Chromatography using polyethylene terephthalates as standards.

The characteristics of copolyether-ester resins A-H are summarized in Table I. Copolyether-ester resins G and H are outside the scope of this invention, and will be used in Control Examples B-D.

Preparation of Molding Compositions

The glass fibers employed as the reinforcing fibers were Owens Corning Fiberglas "419-A" 3/16 inch chopped strands of about 15 μm diameter. After extrusion, each fiber was broken, on average, into six pieces, and no appreciable further breakage occurred during injection molding of the test bars.

TABLE I

| | COPOLYETHER-ESTER RESINS | | | |
|---|---|---|---|---|
| Resin Designation | Number-Average Molecular Weight | Shore D Hardness | Wt % Short Chain Ester Units | Dicarboxylic Acid (T/I) Ratio |
| A | 32,000 | 40 | 49 | 3.5 |
| B | 34,000 | 55 | 60 | All T |
| C | 27,000 | 72 | 82 | All T |
| D | 29,000 | 63 | 78 | 9.1[1] |
| E | 25,000 | 55 | 60 | All T |
| F[2] | 6,300 | — | 60 | All T |
| G[3] | 46,000 | — | 27–30 | 2.4–9.0[4] |
| H | 15,000 | — | 100 | All T |

[1]Dimethyl o-phthalate was used in place of dimethyl isophthalate.
[2]Prepared by thermal cracking of Resin E by extruding through a single screw extruder fitted with a Kenics static mixing heat at 375°.
[3]PTMEG had a molecular weight of 2100 rather than 975.
[4]T/I not determined; believed to be within specified range.

All ingredients were dried at 100° overnight under vacuum before blending. The resin blends were prepared by first dry blending the polyethylene terephthalate and additives by tumbling. The resulting mixtures were then melt blended and extruded in a 2-inch Sterling two-stage single screw extruder in which the hopper and feed throat were blanketed with nitrogen and the vacuum port was maintained at greater than 22 inches of vacuum. The rear barrel temperature was maintained at 280°–290°, the front at 265°–270°, and the die temperature was 270°. The melt temperature of the resin blends was 280°. The compression ratio of the extruder was 3.4:1 with a metering channel thickness of 0.110 inch. The ratio of the length of the channel to the diameter was 33:1, and the screw speed was 40 revolutions/min.

The extrudate was quenched in water and cut into ⅛-inch pellets. The pellets were dried at 100° under vacuum overnight before injection molding.

The dried pellets were injection molded into test bars on a 6-ounce Van Dorn injection molding machine. Typical molding conditions were as follows: screw speed, 96 revolutions/min; melt temperature, 275°; mold temperature 90°; injection/hold cycle times of 5 sec/35 sec; nozzle temperature, 265°; fill time, 2.5 sec; injection pressure, 150,000 psi.

The surface roughness of the resulting tensile bars, $8\frac{5}{8}'' \times \frac{1}{2}'' \times \frac{1}{8}''$, was measured with a Model 21 Surfanalyzer ® (Instrument Systems Division, Gould, Inc., Cleveland, Ohio) with the following settings; travel speed, 0.01 in/sec; chart speed, 0.1 in/sec; chart travel, 10,000 in/division; cut off, 0.03/0.3. Microinch/division: roughness/average 20/4; Channel A: roughness (profile); Channel B: average roughness. The surface roughness of both of the two broad surfaces of the tensile bars were measured and the average was determined.

EXAMPLES 1–11 AND CONTROL EXAMPLES A–D

In all Examples the polyethylene terephthalate employed was a 4/1 mixture of Mylar ® PET flake (RV=17)/Goodyear 3599 PET (RV=57). In all Examples, except as noted, the compositions also contained 0.70% of talc powder (nucleating agent); 2.50% of a crystalline growth promoting copolyether-ester of the type of resin G; 0.70% of HSTA #3 (stearyl erucamide lubricant, Fine Organics); and 25% of glass fibers as the reinforcing materials.

Molded articles were prepared from the compositions of the several examples and tested for surface roughness by the procedure discussed above. The results are summarized in Table II.

TABLE II
POLYETHYLENE TEREPHTHALATE/COPOLYETHER-ESTER/GLASS FIBER BLENDS

| Example | % PET | Copolyether-Ester Designation | % | Surface Roughness, μ Inch Measured | Average |
|---|---|---|---|---|---|
| 1 | 56.9 | C | 14.2 | 20.6 25.4 | 23.0 |
| 2 | 56.9 | D | 14.2 | 22.3 30.0 | 26.1 |
| 3 | 56.9 | B | 14.2 | 12.4 18.5 | 15.4 |
| 4 | 56.9 | E | 14.2 | 10.9 20.0 | 15.4 |
| 5 | 56.9 | A | 14.2 | 25.8 31.0 | 28.4 |
| 6 | 63.1 | E | 8.0 | 15.2 20.5 | 17.8 |
| 7 | 46.1 | E | 25.0 | 10.1 10.1 | 10.1 |
| 8 | 36.1 | E | 35.0 | 10.4 12.6 | 11.5 |
| 9 | 26.1 | E | 45.0 | 10.8 10.9 | 10.8 |
| 10[1] | 63.6 | F | 10.0 | 14.0 26.0 | 20.0 |
| 11[1] | 58.6 | F | 15.0 | 8.0 32.0 | 20.0 |
| Control A[2] | 69.6 | None | | 81.2 81.2 | 81.2 |
| Control B | 56.1 | H | 15.0 | 55.6 72.9 | 64.2 |
| Control C | 58.6 | G | 12.5 | 17.0 44.0 | 30.5 |
| Control D | 48.6 | G | 22.5 | 52.0 56.0 | 54.0 |

[1] Crystalline growth promoter was not included.
[2] Other additives were 1.0% nucleating agent; 3.4% crystalline growth promoter; 1.0% mold release agent.

I claim:
1. A fiber-reinforced polyethylene terephthalate molding composition which produces injection molded articles having reduced surface roughness which comprises:
   (A) 20–80% by weight of polyethylene terephthalate, having a relative viscosity of 12–90;
   (B) 5–50% by weight of reinforcing fibers; and
   (C) 6–60% by weight of a copolyether-ester having a number-average molecular weight of 3,000–75,000, said copolyether-ester consisting essentially of a multiplicity of recurring intralinear long-chain and short-chain ester units connected through ester linkages,
   (a) said long-chain ester units having the formula:

wherein G is the divalent radical remaining after removal of the terminal hydroxyl groups from a poly(alkylene oxide) glycol having a carbon-to-oxygen mole ratio of 2–4.3 and a number-average molecular weight of 400–6000; and R is the divalent radical remaining after removal of the carboxyl groups from a dicarboxylic acid having a molecular weight of less than 300; and
   (b) said short-chain ester units having the formula:

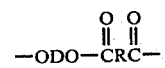

wherein D is the divalent radical remaining after removal of the hydroxyl groups from a low molecular weight diol having a molecular weight of less than 250; and R is as defined above;
   with the proviso that the short-chain ester units constitute 40–90% by weight of the copolyether-ester, and the long-chain ester units constitute 10–60% by weight of the copolyether-ester.

2. The molding composition of claim 1 in which the polyethylene terephthalate is present in the amount of 45–70% by weight, and has a relative viscosity of 16–30.

3. The molding composition of claim 2 in which the reinforcing fiber is glass fiber which has an average length of less than 1 inch and is present in the amount of 20–30% by weight.

4. The molding composition of claim 3 in which the copolyether-ester has a number-average molecular weight of 25,000–45,000 and is present in the amount of 10–35% by weight.

5. The molding composition of claim 4 in which the short-chain ester units constitute 45–75% by weight of the copolyether-ester and the long-chain ester units constitute 25–55% by weight.

6. The molding composition of claim 5 in which the copolyether-ester is prepared from a dimethyl phthalate, 1,4-butanediol, and polytetramethylene ether glycol having a number-average molecular weight of 600–2000.

7. The molding composition of claim 6 in which the dimethyl phthalate is at least 70 mole percent dimethyl terephthalate.

* * * * *